US009222549B2

(12) United States Patent
Mellet et al.

(10) Patent No.: US 9,222,549 B2
(45) Date of Patent: *Dec. 29, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); James B. Borgerson, Clarkston, MI (US); Daryl A. Wilton, Macomb, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/848,912

(22) Filed: Mar. 22, 2013

(65) Prior Publication Data

US 2013/0267373 A1     Oct. 10, 2013

Related U.S. Application Data

(60) Provisional application No. 61/620,256, filed on Apr. 4, 2012.

(51) Int. Cl.

| | |
|---|---|
| *F16H 3/62* | (2006.01) |
| *F16D 11/14* | (2006.01) |
| *F16D 21/00* | (2006.01) |
| *F16H 3/66* | (2006.01) |
| *F16D 23/04* | (2006.01) |
| *F16D 25/061* | (2006.01) |
| *F16D 23/06* | (2006.01) |

(52) U.S. Cl.

CPC ...... *F16H 3/62* (2013.01); *F16D 21/00* (2013.01); *F16D 23/04* (2013.01); *F16D 25/061* (2013.01); *F16H 3/66* (2013.01); *F16D 11/14* (2013.01); *F16D 2023/0643* (2013.01); *F16D 2023/0693* (2013.01); *F16H 2200/0073* (2013.01); *F16H 2200/2012* (2013.01); *F16H 2200/2046* (2013.01)

(58) Field of Classification Search

CPC ...... F16H 3/62; F16H 3/66; F16H 2200/0073; F16H 2200/0086; F16H 2200/2012; F16H 2200/2046; F16D 23/04; F16D 11/14; F16D 2023/0693

USPC ........... 475/278; 192/53.1, 53.5, 85.18, 85.24

See application file for complete search history.

(56) References Cited

U.S. PATENT DOCUMENTS

| | | | | |
|---|---|---|---|---|
| 1,681,714 | A * | 8/1928 | Tullar | 192/53.5 |
| 1,969,993 | A * | 8/1934 | Schmidt | 192/53.5 |
| 6,079,535 | A * | 6/2000 | Mueller et al. | 192/48.2 |
| 7,108,115 | B2 * | 9/2006 | Ebenhoch et al. | 192/53.1 |

(Continued)

FOREIGN PATENT DOCUMENTS

| | | | |
|---|---|---|---|
| FR | 2897136 | * | 10/2007 |
| WO | WO2009/129113 | * | 10/2009 |

*Primary Examiner* — Colby M Hansen

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes actuatable in combinations of two to establish a plurality of forward gear ratios and one reverse gear ratio. One of the torque transmitting devices includes a friction clutch disposed in parallel with a binary clutch.

22 Claims, 6 Drawing Sheets

(56) References Cited

U.S. PATENT DOCUMENTS

| | | | |
|---|---|---|---|
| 7,546,914 B2* | 6/2009 | Schranz et al. | 192/48.4 |
| 8,303,455 B2 | 11/2012 | Gumpoltsberger et al. | |
| 8,425,370 B2 | 4/2013 | Leesch et al. | |
| 8,905,212 B2* | 12/2014 | Vierk et al. | 192/53.1 |
| 2004/0102278 A1 | 5/2004 | Usoro et al. | |
| 2005/0241903 A1* | 11/2005 | Rebholz | 192/53.361 |
| 2008/0108472 A1 | 5/2008 | Seo | |
| 2011/0251014 A1* | 10/2011 | Leesch et al. | 475/296 |
| 2012/0010038 A1 | 1/2012 | Hart et al. | |
| 2013/0267366 A1* | 10/2013 | Mellet et al. | 475/5 |
| 2013/0267370 A1* | 10/2013 | Mellet et al. | 475/276 |
| 2013/0267371 A1* | 10/2013 | Mellet et al. | 475/276 |
| 2013/0267372 A1* | 10/2013 | Mellet et al. | 475/276 |
| 2014/0057751 A1* | 2/2014 | Mellet et al. | 475/54 |

\* cited by examiner

| GEAR STATE | GEAR RATIO | RATIO STEP | TORQUE TRANSMITTING ELEMENTS ||||||
|---|---|---|---|---|---|---|---|---|
| | | | 36 | 34 | 32 | 26 | 24 | 28 |
| REV1 | -4.563 | | | X | X | | | X |
| REV2 | -6.019 | | X | X | X | | | |
| N | | | | | | | | |
| 1ST | 4.935 | | | | X | X | | X |
| 2ND | 3.445 | 1.43 | X | | X | X | | |
| 3RD | 2.257 | 1.53 | X | | | X | | X |
| 4TH | 1.886 | 1.20 | X | X | | X | | |
| 5TH | 1.422 | 1.33 | | X | | X | | X |
| 6TH | 1.255 | 1.13 | X | | | X | X | |
| 7TH | 1.000 | 1.25 | | | | X | X | X |
| 8TH | 0.893 | 1.12 | | X | | X | X | |
| 9TH | 0.800 | 1.12 | | X | | | X | X |
| 10TH | 0.767 | 1.04 | X | X | | | X | |
| 11TH | 0.681 | 1.13 | X | | | | X | X |

X = ON - ENGAGED CARRYING TORQUE

FIG. 3

MULTI-SPEED TRANSMISSION

CROSS-REFERENCE TO RELATED APPLICATION

This application claims the benefit of U.S. Provisional Application No. 61/620,256 filed Apr. 4, 2012, which is incorporated herein by reference in its entirety.

FIELD

The invention relates generally to a multiple speed transmission, and more particularly, to a transmission having a plurality speeds, planetary gear sets and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

In addition, different types of clutches, or torque transmitting mechanisms, are used in automatic transmissions depending on the desired shifting needs. Friction clutches generally have a smooth transmission; however, they have a low torque capacity. Binary clutches, such as dog clutches or band clutches, have a high torque capacity, but they typically have a hard shift transition.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

The clutches and brakes can be of any type including but not limited to a fiction clutch, a friction band, a one way clutch, a selectable one way clutch, a dog clutch, a synchronizer and similar devices. Furthermore, any node can use a single device or a combination of these devices e.g. the first brake may be configured as a dog clutch and a one way clutch combination or a one way clutch and friction clutch combination. Similarly, several other combinations are possible.

In one aspect of the present disclosure, which may be combined with or separate from the other aspects described herein, a torque transmitting device assembly for selectively transmitting torque between a first member and a second member is provided. The torque transmitting device includes a binary clutch, a friction clutch disposed in parallel with the binary clutch, and an actuator configured to engage both the friction clutch and the binary clutch.

In another aspect, which may be combined with or separate from the other aspects described herein, a transmission is provided that includes an input member, an output member, first, second, third and fourth planetary gear sets each having first, second and third members, three interconnecting members continuously interconnecting a member of the first, second, third and fourth planetary gear sets with another member of the first, second, third and fourth planetary gear sets, and six torque transmitting mechanisms. Three of the six torque transmitting mechanisms are each selectively engageable to interconnect at least one of the first, second and third members with at least one other of the first, second, third members, and three of the six torque transmitting mechanisms are each selectively engageable to interconnect at least one of the first, second and third members with the stationary member. The six torque transmitting mechanisms are selectively engageable in combinations of at least three to establish a plurality of forward speed ratios and at least one reverse speed ratio between the input member and the output member. A first of the six torque transmitting mechanisms includes a binary clutch, a friction clutch disposed in parallel with the binary clutch, and an actuator configured to engage both the friction clutch and the binary clutch.

In yet another aspect, which may be combined with or separate from the other aspects described herein, a transmission is provided that includes an input member, an output member, first, second, third and fourth planetary gear sets each having a sun gear, a carrier member and a ring gear, three interconnecting members, and six torque transmitting mechanisms. The input member is continuously connected for common rotation with the sun gear of the first planetary gear set. The output member is continuously connected for common rotation with the ring gear of the fourth planetary gear set.

The first interconnecting member continuously interconnects the carrier member of the first planetary gear set with the ring gear of the third planetary gear set. The second interconnecting member continuously interconnects the ring gear of the first planetary gear set with the carrier member of the second planetary gear set. The third interconnecting member continuously interconnects the ring gear of the second planetary gear set with the carrier member of the third planetary gear set and the sun gear of the fourth planetary gear set.

The first torque transmitting mechanism is selectively engageable to interconnect the sun gear of the first planetary gear set and the input member with the carrier member of the fourth planetary gear set. The second torque transmitting mechanism is selectively engageable to interconnect the carrier member of the first planetary gear set and the ring gear of the third planetary gear set with the carrier member of the fourth planetary gear set. The third torque transmitting mechanism is selectively engageable to interconnect the carrier member of the fourth planetary gear set with the stationary member. The a fourth torque transmitting mechanism is selectively engageable to interconnect the sun gear of the third planetary gear set with the stationary member. The fifth torque transmitting mechanism selectively engageable to interconnect the sun gear of the second planetary gear set with the stationary member. The sixth torque transmitting mechanism is selectively engageable to interconnect the ring gear of the second planetary gear set and the carrier member of the third planetary gear get set with one of the following: a) the sun gear of the second planetary gear set; or b) the carrier member of the second planetary gear set and the ring gear of the first planetary gear set.

The torque transmitting mechanisms are selectively engageable in combinations of at least three to establish a plurality of forward speed ratios and at least one reverse speed ratio between the input member and the output member. The second torque transmitting mechanism includes a binary clutch, a friction clutch disposed in parallel with and adjacent to the binary clutch, and an actuator configured to engage both the friction clutch and the binary clutch. The friction clutch is disposed between the binary clutch and the actuator. The friction clutch has a friction clutch backing plate against which the friction clutch is applied. The friction clutch backing plate is configured to selectively apply pressure on the binary clutch. The second torque transmitting mechanism also includes a biasing member and a binary clutch backing plate. The biasing member is configured to bias the friction clutch backing plate away from the binary clutch, the biasing member being disposed between the friction clutch backing plate and the binary clutch backing plate. The friction clutch backing plate is configured to compress the biasing member such that when the biasing member is compressed to an engaged position. The friction clutch backing plate engages the binary clutch.

The binary clutch has a first half having a first set of teeth and a second half having a second set of teeth. The first half is configured to rotate with the fourth interconnecting member, and the second half is configured to rotate with the first interconnecting member. The friction clutch has at least one first clutch plate and at least one second clutch plate, the first clutch plate being configured to rotate with the fourth interconnecting member and the second clutch plate being configured to rotate with the first interconnecting member.

The transmission is configured to apply a first pressure to the actuator such that when the first pressure is applied to the actuator, the friction clutch is engaged while the binary clutch remains disengaged. The transmission is further configured to apply a second pressure to the actuator such that when the second pressure is applied to the actuator, the binary clutch is engaged. The second pressure is greater than the first pressure.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1 and 2;

DETAILED DESCRIPTION

The following description is merely exemplary in nature and is not intended to limit the present disclosure, application, or uses.

At the outset, it should be appreciated that the embodiments of the eleven speed automatic transmission of the present disclosure have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a second component or element of a first planetary gear set is permanently coupled to a first component or element of a third planetary gear set. A third component or element of the first planetary gear set is permanently coupled to a second component or element of a second planetary gear set. A first component or element of the second planetary gear set is permanently coupled to a second component or element of a third planetary gear set and to a third component or element of a fourth planetary gear set.

Figure 1:
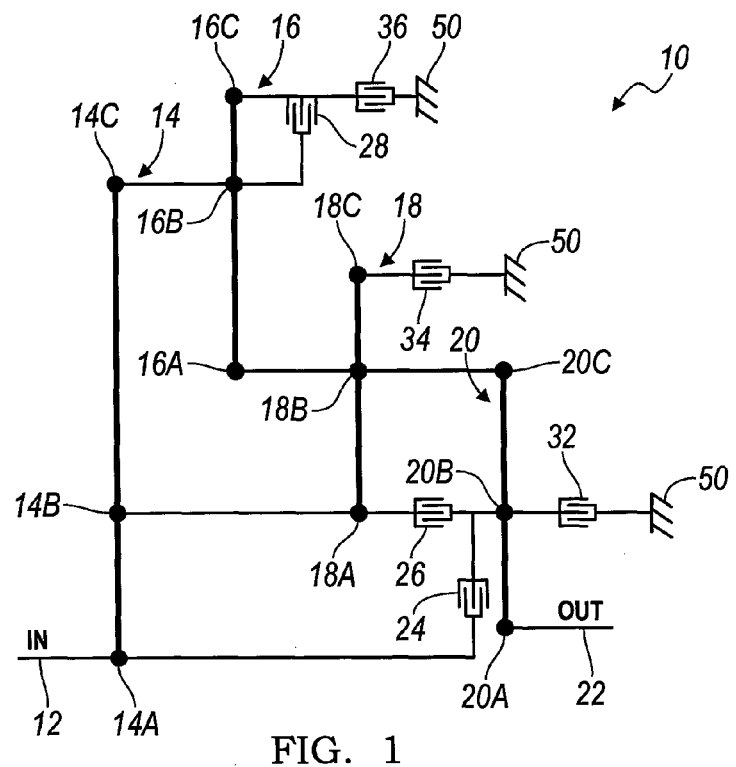
FIG. 1 is a lever diagram of an embodiment of an eleven speed transmission according to the principles of the present disclosure.

Referring now to FIG. 1, an embodiment of an eleven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 14A of the first planetary gear set 14. The output member 22 is continuously coupled to the first node 20A of the fourth planetary gear set 20.

The second node 14B of the first planetary gear set 14 is coupled to the first node 18A of the third planetary gear set 18.

The third node 14C of the first planetary gear set 14 is coupled to the second node 16B of the second planetary gear set 16. The first node 16A of the second planetary gear set 16 is coupled to the third node 18B of the third planetary gear set 18 and to the third node 20C of the fourth planetary gear set 20.

A first clutch 24 selectively connects the first node 14A of the first planetary gear set 14 with the second node 20B of the fourth planetary gear set 20. A second clutch 26 selectively connects the second node 14B of the first planetary gear set 14 and the first node 18A of the third planetary gear set 18 with the second node 20B of the fourth planetary gear set 20. A third clutch 28 selectively connects the third node 14C of the first planetary gear set 14 and the second node 16B of the second planetary gear set 16 with the third node 16C of the second planetary gear set 16.

A first brake 32 selectively connects the second node 20B of the fourth planetary gear set 20 with the stationary member or transmission housing 50. A second brake 34 selectively connects the third node 18C of the third planetary gear set 18 with the stationary member or transmission housing 50. A third brake 36 selectively connects the third node 16C of the second planetary gear set 16 with the stationary member or transmission housing 50.

Figure 2:
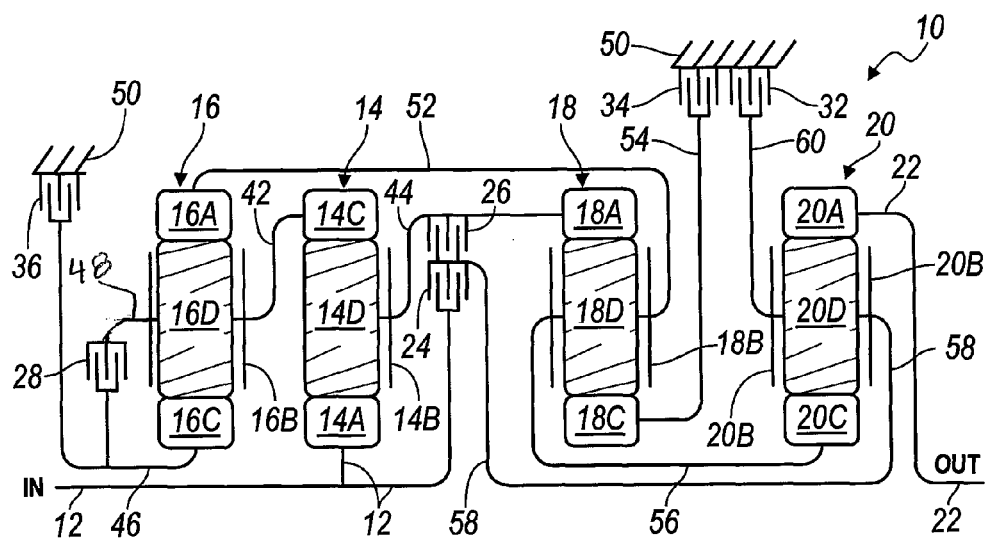
FIG. 2 is a diagrammatic illustration of an embodiment of an eleven speed transmission, in accordance with the principles of the present disclosure.
Figure 4A:
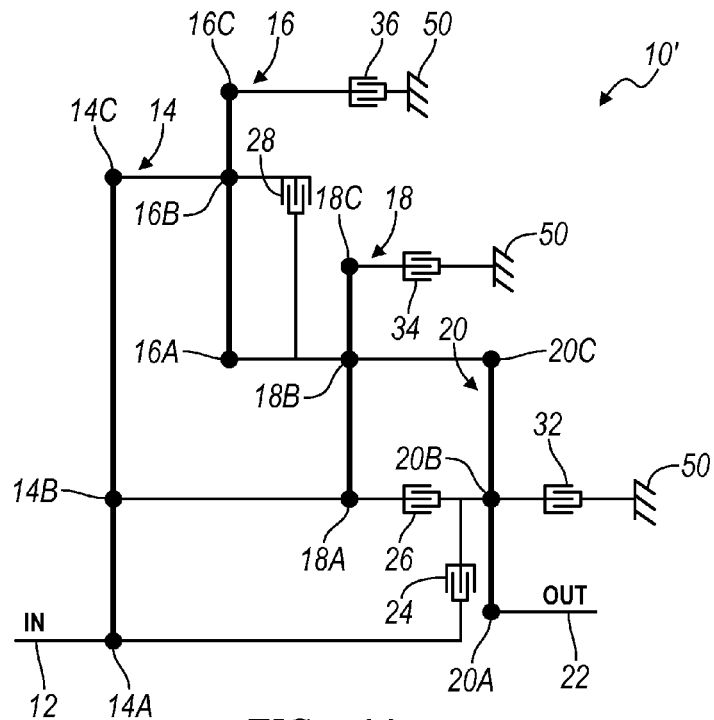
FIGS. 4A, 4B, 5A, 5B, 6A and 6B are diagrammatic illustrations of a variation interconnections of the third clutch 28 according to the principles of the present disclosure.
Figure 4B:
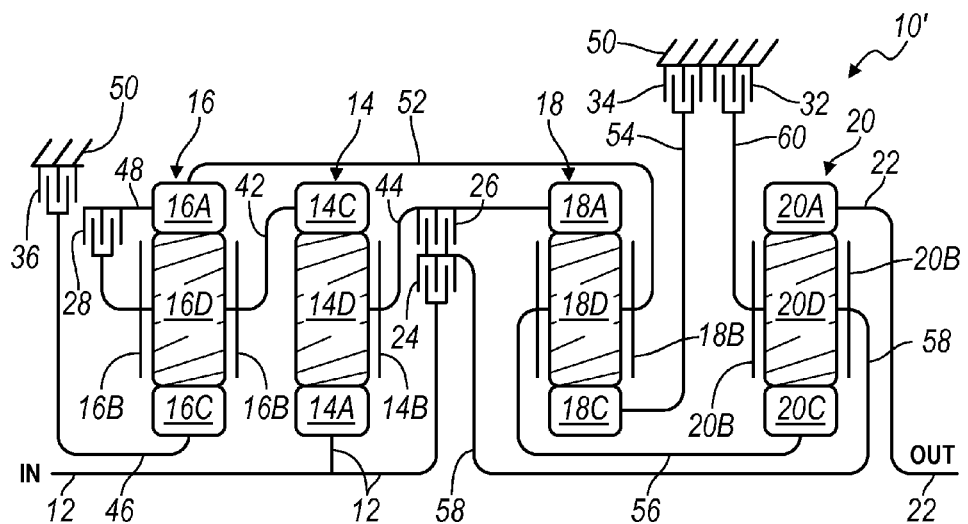
Figure 5A:
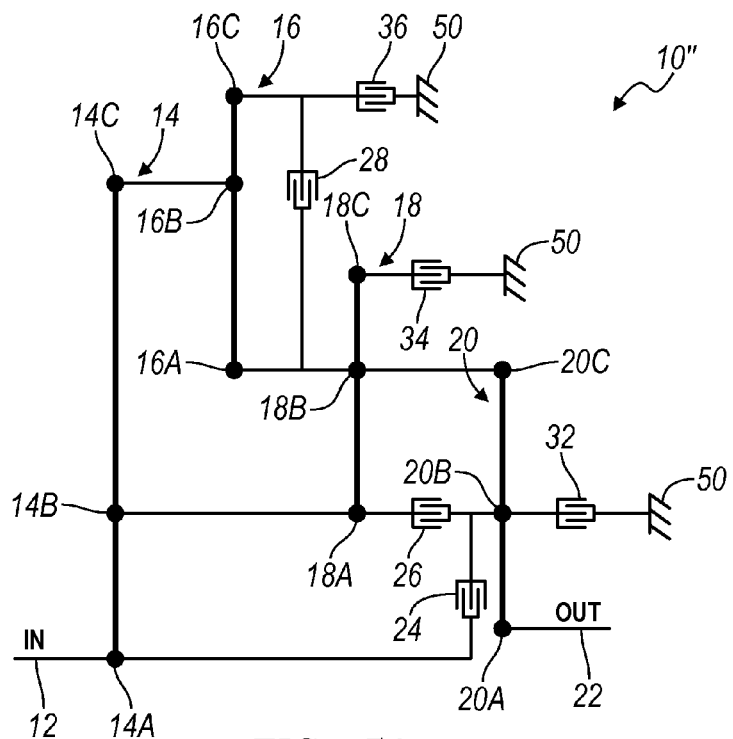
Figure 5B:
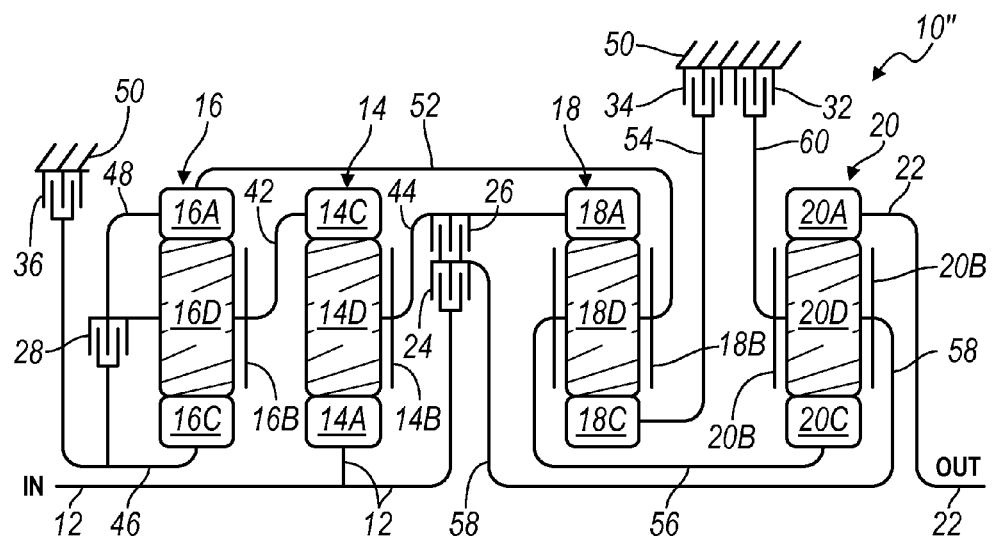
Figure 6A:
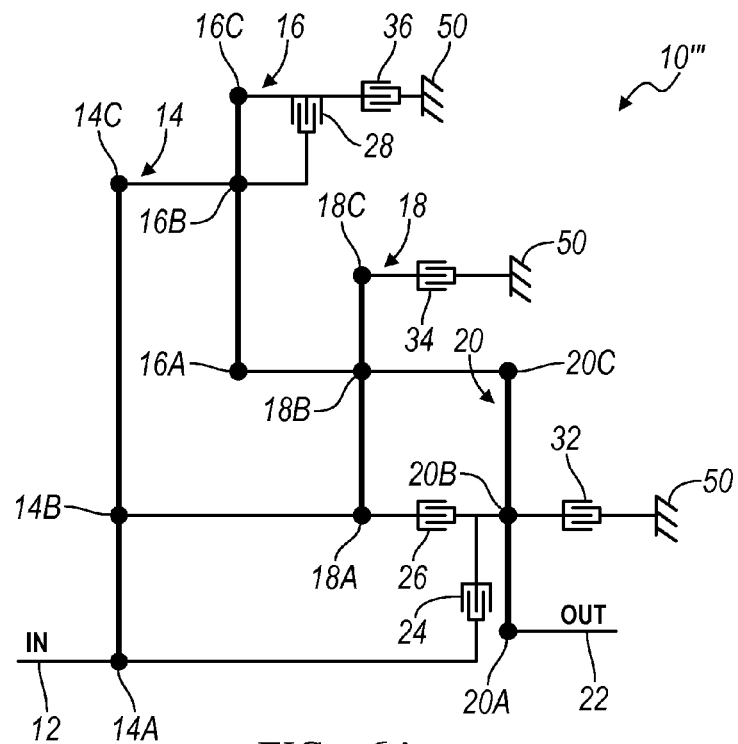
Figure 6B:
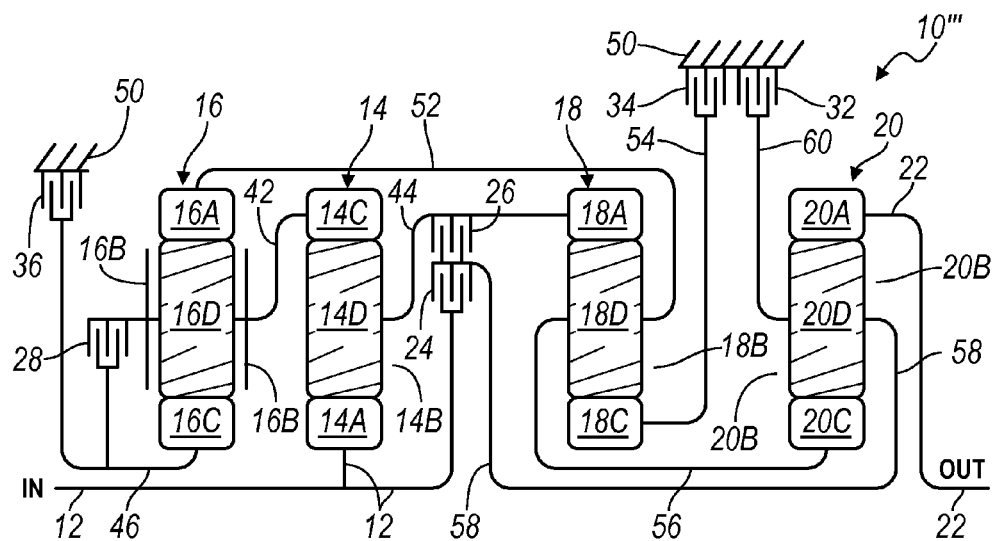

Referring now to FIG. 2, a stick diagram presents a schematic layout of an embodiment of the eleven speed transmission 10 according to one form of the present disclosure. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14B, and a planet gear carrier member 14C that rotatably supports a set of planet gears 14D (only one of which is shown) The sun gear member 14A is connected for common rotation with the input shaft or member 12. The ring gear member 14C is connected for common rotation with a first shaft or interconnecting member 42. The planet carrier member 14B is connected for common rotation with a second shaft or interconnecting member 44. The set of planet gears 14D are each configured to intermesh with both the sun gear member 14A and the ring gear member 14C.

The second planetary gear set 16 includes a sun gear member 16C, a ring gear member 16A, and a planet gear carrier member 16B that rotatably supports a set of planetary gears 16D (only one of each is shown). The sun gear member 16C is connected for common rotation with the third shaft or interconnecting member 46. The ring gear member 16A is connected for common rotation with a fourth shaft or interconnecting member 48 and a fifth shaft or interconnecting member 52. The planet carrier member 16B is connected for common rotation with the first shaft or interconnecting member 42. The planet gears 16D are each configured to intermesh with both the ring gear member 16A and the sun gear member 16C.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with a sixth shaft or interconnecting member 54. The planet carrier member 18B is connected for common rotation with the sixth shaft or interconnecting member 52 and a seventh shaft or interconnecting member 56. The ring gear member 18A is connected for common rotation with the second shaft or interconnecting member 44. The planet gears 18D are each configured to intermesh with both the sun gear member 18C and the ring gear member 18A.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with the seventh shaft or interconnecting member 56. The ring gear member 20A is connected for common rotation with the output shaft or member 22. The planetary gear carrier member 20B is connected for common rotation with an eighth shaft or interconnecting member 58 and a ninth shaft or interconnecting member 60. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 24, 26, 28 and the first, second and third brakes 32, 34 and 36 allow for selective interconnection of the shafts or interconnecting members 42, 44, 46, 48, 52, 54, 56, 58 and 60 of the planetary gear sets 14, 16, 18, 20 and the housing 50.

For example, the first clutch 24 is selectively engageable to connect the input shaft or member 12 with the eighth shaft or interconnecting member 58. The second clutch 26 is selectively engageable to connect the second shaft or interconnecting member 44 with the eighth shaft or interconnecting member 58. The third clutch 28 is selectively engageable to connect the fourth shaft or interconnecting member 48 with the third shaft or interconnecting member 46.

The first brake 32 is selectively engageable to connect the ninth shaft or interconnecting member 60 with the stationary element or the transmission housing 50 in order to restrict the member 60 from rotating relative to the transmission housing 50. The second brake 34 is selectively engageable to connect the sixth shaft or interconnecting member 54 with the stationary element or the transmission housing 50 in order to restrict the member 54 from rotating relative to the transmission housing 50. The third brake 36 is selectively engageable to connect the third shaft or interconnecting member 46 with the stationary element or the transmission housing 50 in order to restrict the member 46 from rotating relative to the transmission housing 50. In turn, the components of the planetary gear sets connected to each of the connecting members are also connected or restricted accordingly.

Referring now to FIG. 2 and FIG. 3, the operation of the eleven speed transmission 10 embodiment will be described. It will be appreciated that transmission 10 is capable of transmitting torque from the input shaft or member 12 to the output shaft or member 22 in eleven or more forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 32, second brake 34 and third brake 36), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. An "O" in the box means that a particular clutch or brake is engaged but not carrying torque (no "O's" are present in FIG. 3). Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the third clutch 28, the first brake 32 and the second brake 34 are engaged or activated. The third clutch 28 connects the third shaft or interconnecting member 46 with the fourth shaft or interconnecting member 48. The first brake 32 connects the ninth shaft or interconnecting member 60 with the stationary element or the transmission housing 50 in order to restrict the member 60 from rotating relative to the transmission housing 50, which restricts the carrier member 20B from rotating relative to the transmission housing 50. The second brake 34 connects the sixth shaft or interconnecting member 54 with the stationary element or the transmission housing 50 in order to restrict the member 54 from rotating relative to the transmission housing 50, which restricts the sun gear 18C from rotating relative to the transmission housing 50. Likewise, eleven forward ratios are achieved through different combinations of clutch and brake engagement, as shown in FIG. 3, by way of example.

Further, the present disclosure contemplates that at least one additional reverse gear (REV2) is achievable by the transmission of FIGS. 1 and 2. As shown in FIG. 3, a second reverse gear ratio is achieved through selective activation or engagement of the first brake 32, the second brake 34 and the third brake 36. The first brake 32 connects the ninth shaft or interconnecting member 60 with the stationary element or the transmission housing 50 in order to restrict the member 60 from rotating relative to the transmission housing 50, which restricts the carrier member 20B from rotating relative to the transmission housing 50. The second brake 34 connects the sixth shaft or interconnecting member 54 with the stationary element or the transmission housing 50 in order to restrict the member 54 from rotating relative to the transmission housing 50, which restricts the sun gear 18C from rotating relative to the transmission housing 50. The third brake 36 connects the third shaft or interconnecting member 46 with the stationary element or the transmission housing 50 in order to restrict the member 46 from rotating relative to the transmission housing 50, which restricts the sun gear 16C from rotating relative to the transmission housing 50.

It will be appreciated that the foregoing explanation of operation and gear states of the eleven speed embodiment of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Additionally, the present disclosure contemplates multiple interconnections for the third clutch 28 as illustrated in FIGS. 4A, 4B, 5A, 5B, 6A and 6B.

Figure 7:
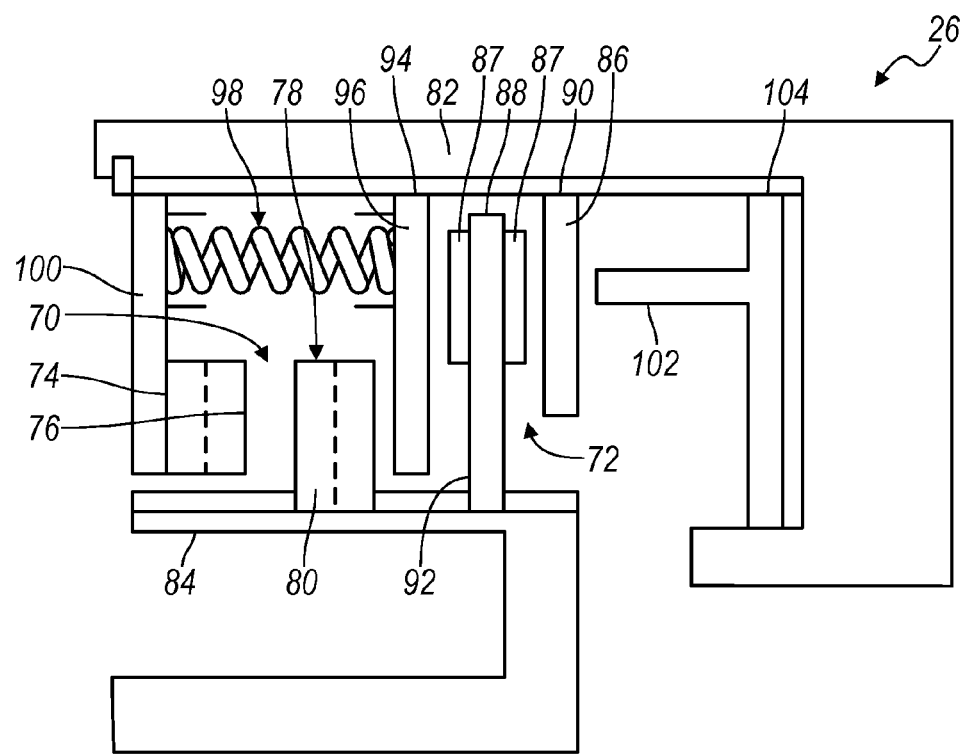
FIG. 7 is a schematic cross-sectional view of a torque transmitting mechanism of a transmission of FIGS. 1, 2, 4A, 4B, 5A, 5B, 6A, and/or 6B, in accordance with the principles of the present disclosure.

Referring now to FIG. 7, the second clutch 26 of the transmission 10 of FIG. 1 or 2, or the variations of FIG. 4A, 4B, 5A, 5B, 6A, or 6B, will be described in further detail. The second clutch 26 is a rotating clutch that includes a low-loss binary clutch 70 and a friction clutch 72. The binary clutch 70 is disposed in parallel with and adjacent to the friction clutch 72.

The low-loss binary clutch 70 is an on-off type clutch, such as a dog clutch, that may be capable of carrying high levels of torque after full engagement. For example, the binary clutch 70 may be a dog clutch that has a first half 74 having a first set of teeth 76 extending from the first half 74 and a second half 78 having a second set of teeth 80 extending from the second half 78. Each set of teeth 76, 80 has grooves formed therein separating the teeth 76, 80. The first and second sets of teeth 76, 80 and grooves are selectively engageable with one another to engage the binary clutch 70. Thus, the binary clutch 70 may have two halves 74, 78 having opposed teeth 76, 80 and grooves, the first half 74 which is connected to an outer member 82 or another member, and the second half 78 which is connected to an inner clutch hub 84 or other member. The binary clutch 70 engages, not by friction, but by interference and meshing of the teeth 76, 80 and grooves of the halves 74, 78 of the binary clutch 70. The binary clutch 70 may have near zero, or negligible, spin losses; therefore, the binary clutch 70 may be a high capacity clutch with no compliance and zero or negligible slip.

The friction clutch 72 of the second clutch 26 may be a low-capacity friction clutch having any desirable number of interleaved clutch plates 86, 88, which may be friction discs. For example, the friction clutch 72 may have one, two, or more interleaved clutch plates 86, 88. The friction clutch plates 86, 88 may have slippage when applied, providing for a smooth shifting transition.

In the illustrated embodiment, the friction clutch 72 includes a first clutch plate 86 disposed adjacent to a second clutch plate 88. The first clutch plate 86 is slidingly splined to the outer member 82, such that the first clutch plate 86 rotates with the outer member 82 but may slide axially along a sliding spline 90 formed between the first clutch plate 86 and the outer member 82. The sliding spline 90 includes teeth and grooves running in axial direction (from left to right in FIG. 7), such that teeth and grooves formed in the outer member 82 are slidingly mated with teeth and grooves formed in the first clutch plate 86. In the alternative, the first clutch plate 86 may be rigidly connected to the outer member 82, such that the first clutch plate 86 does not slide along the sliding spline 90 or move in any other direction.

The second clutch plate 88 is slidingly splined to the inner clutch hub 84, such that the second clutch plate 88 rotates with the inner clutch hub 84 but may slide axially along a sliding spline 92 formed between the second clutch plate 88 and the inner clutch hub 84. The sliding spline 92 includes teeth and grooves running in axial direction (from left to right in FIG. 7), such that teeth and grooves formed in the inner clutch hub 84 are slidingly mated with teeth and grooves formed in the second clutch plate 88. In the alternative, the second clutch plate 88 may be rigidly connected to the inner clutch hub 84, such that the second clutch plate 88 does not slide along the sliding spline 92 or move in any other direction.

One or more of the friction clutch plates 86, 88 may have friction material 87 disposed on a surface of the clutch plate 86, 88 if desired. In the illustrated embodiment, the second clutch plate 88 has friction material 87 disposed on both of its faces.

A friction clutch backing plate 94 is disposed adjacent to the second clutch plate 88. The friction clutch backing plate 94 is slidingly splined to the outer member 82 such that the friction clutch backing plate 94 rotates with the outer member 82 but may slide axially along a sliding spline 96. The sliding spline 96 includes teeth and grooves running in axial direction (from left to right in FIG. 7), such that teeth and grooves formed in the outer member 82 are slidingly mated with teeth and grooves formed in the friction clutch backing plate 94.

The friction clutch backing plate 94 acts as an apply plate for the binary clutch 70. A spring 98, such as a coil spring, is disposed between the friction clutch backing plate 94 and a binary clutch backing plate 100. The binary clutch backing plate 100 is connected to the outer member 82, in this embodiment. A rotating piston 102 is movably connected to the outer member 82; the piston 102 rotates with the outer member 82, but the piston 102 is configured to move axially along a sliding spline 104 in the outer member 82. In the alternative, the piston 102 may move axially with respect to the outer member 82 in any other desirable manner, and the piston 102 need not necessarily have a sliding spline 104 connection to the outer member 82.

When the piston 102 is applied, the piston 102 contacts the first clutch plate 86 of the friction clutch 72 and compresses the first clutch plate 86 into the second clutch plate 88. The piston further pushes both clutch plates 86, 88 against the friction clutch backing plate 94. This results in synchronizing the motion of the outer member 82 and the inner clutch hub 84. In other words, when the clutch plates 86, 88 of the friction clutch 72 are engaged, the outer member 82 and the inner clutch hub 84 rotate together.

After the friction clutch 72 is engaged, additional force may be applied to the piston 102 to push the friction clutch plates 86, 88 axially further along the sliding splines 90, 92, 96 and to move the friction clutch backing plate 94 axially along the sliding spline 96 (to the left, in the orientation of FIG. 7). Accordingly, the piston 102 is operable to push the friction clutch plates 86, 88 and the friction clutch backing plate 94 into the spring 98 and to compress the spring 98 with the clutch plates 86, 88 and the friction clutch backing plate 94. The piston 102 is operable to press the clutch plates 86, 88, the friction clutch backing plate 94, and the spring 98 against the binary clutch backing plate 100.

As the piston 102 moves the friction clutch backing plate 94 axially along the sliding spline 96, the friction clutch backing plate 94 pushes the second half 78 of the binary clutch 70 into contact with the first half 74 of the binary clutch 70. Before the binary clutch halves 74, 78 are engaged, the friction clutch 72 is engaged, and therefore, the outer member 82 and the inner clutch hub 84 are rotating together when the binary clutch halves 74, 78 are engaged. In other words, the piston 102 is operable to first engage the friction clutch 72 before engaging the binary clutch 70. Accordingly, the first set of teeth and grooves 76 and the second set of teeth and grooves 80 can smoothly engage, since both halves 74, 78 of the binary clutch 70 are rotating together when the halves 74, 78 are engaged.

To engage the second clutch 26, both the friction clutch 72 and the binary clutch 70 are engaged. A first regulated clutch pressure is applied to the piston 102 to engage the friction clutch 72 alone, while the binary clutch 70 remains disengaged. Thus, a synchronizing load is applied to the friction clutch 72, bringing the inner clutch hub 84 and the outer member 82 into rotation together. Once the speed across the halves 74, 78 of the binary clutch is below a predetermined threshold (or zero), an increased amount of pressure is applied to the piston 102 to compress the spring 98 and bring the halves 74, 78 of the dog clutch into engagement.

With the illustrated configuration of the parallel clutches 70, 72 of the second clutch 26, the friction clutch 72 may be sized to carry a low torque, or to have a low-torque capacity. The friction clutch 72 need not be sized for a high torque capacity because the binary clutch 70 has a high torque capacity. The friction clutch 72 in the parallel arrangement of FIG. 7 causes the binary clutch 70 to be engaged when the binary clutch halves 74, 78 are rotating together, and therefore, the binary clutch 70 can be engaged smoothly even while the outer member 82 and the inner clutch hub 84 are rotating, because the outer member 82 and the inner clutch hub 84 are rotating together when the binary clutch 70 is engaged. Thus, the opposed surfaces of the clutch halves 74, 78 are engaged without an abrupt feeling of heavy shifting that would be apparent to vehicle occupants.

The spring 98 exerts a force on the friction clutch backing plate 94. Accordingly, when the piston 102 moves back to the right (in the orientation of FIG. 7), the spring 98 expands and moves the friction clutch backing plate 94 away from the second half 78 of the binary clutch 70 to disengaged the binary clutch halves 74, 78.

The second clutch 26 is placed in the transmission 10 power flow in the location explained above in FIGS. 1 and 2. Accordingly, the inner clutch hub 84 is connected to either the second node 20B of the fourth planetary gear set 20 or the first node 18A of the third planetary gear set 18, and the outer member 82 is connected to either the second node 20B of the fourth planetary gear set 20 or the first node 18A of the third planetary gear set 18. In the illustrated embodiment of FIG. 7, the outer member 82 is connected to the first node 18A of the third planetary gear set 18 and the second node 14B of the first planetary gear set 14, and the inner clutch hub 84 is connected to the second node 20B of the fourth planetary gear set 20. Thus, the first half 74 of the binary clutch 70 and the first clutch plate 86 are connected to the first node 18A of the third planetary gear set 18 and the second node 14B of the first planetary gear set 14, and the second half 78 of the binary clutch 70 and the second clutch plate 88 are connected to the second node 20B of the fourth planetary gear set 20. Accordingly, when the second clutch 26 is engaged, it connects the second node 20B of the fourth planetary gear set 20 and the first node 18A of the third planetary gear set 18 for common rotation with each other.

The description of the invention is merely exemplary in nature and variations that do not depart from the gist of the invention are intended to be within the scope of the invention. For example, the second clutch 26 having a friction clutch 72 and a binary clutch 70 may be used as one of the other clutches or brakes described herein. Such variations are not to be regarded as a departure from the spirit and scope of the invention.

What is claimed is:

1. A torque transmitting device assembly for selectively transmitting torque between a first member and a second member, the torque transmitting device comprising:
   a binary clutch including a binary clutch backing plate;
   a friction clutch disposed in parallel with the binary clutch, the friction clutch including a first clutch plate, a second clutch plate, and a friction clutch backing plate, and wherein the binary clutch backing plate and the friction clutch backing plate are splined to the first member for common rotation;
   a biasing member disposed between the friction clutch backing plate and the binary clutch backing plate and configured to bias the friction clutch backing plate away from the binary clutch; and
   an actuator configured to directly engage the first clutch plate of the friction clutch.

2. The torque transmitting device assembly of claim 1, wherein the friction clutch backing plate is acted against by the friction clutch, the friction clutch backing plate configured to selectively apply pressure on the binary clutch.

3. The torque transmitting device assembly of claim 2, wherein the friction clutch backing plate being configured to compress the biasing member such that when the biasing member is compressed to an engaged position, the friction clutch backing plate engages the binary clutch.

4. The torque transmitting device assembly of claim 3, wherein the binary clutch is disposed adjacent to the friction clutch, the friction clutch being disposed between the binary clutch and the actuator.

5. The torque transmitting device assembly of claim 4, wherein the binary clutch is a dog clutch.

6. The torque transmitting device assembly of claim 5, wherein the binary clutch has a first half having a first set of teeth and a second half having a second set of teeth, the first half being configured to rotate with the first member and the second half being configured to rotate with the second member, the first clutch plate being configured to rotate with the first member and the second clutch plate being configured to rotate with the second member.

7. The torque transmitting device assembly of claim 1, wherein the torque transmitting device assembly is configured to apply a first pressure to the actuator such that when the first pressure is applied to the actuator, the friction clutch is engaged while the binary clutch remains disengaged, and the torque transmitting device assembly being configured to apply a second pressure to the actuator such that when the second pressure is applied to the actuator, the binary clutch is engaged, the second pressure being greater than the first pressure.

8. A transmission comprising:
an input member;
an output member;
first, second, third and fourth planetary gear sets each having first, second and third members, and wherein the input member is continuously connected for common rotation with the first member of the first planetary gear set and the output member is continuously connected for common rotation with the first member of the fourth planetary gear set;
three interconnecting members continuously interconnecting at least one member of the first, second, third and fourth planetary gear sets with another member of the first, second, third and fourth planetary gear sets; and
six torque transmitting mechanisms wherein three of the six torque transmitting mechanisms are each selectively engageable to interconnect at least one of the first, second and third members with at least one other of the first, second, third members and wherein three of the six torque transmitting mechanisms are each selectively engageable to interconnect at least one of the first, second and third members with a stationary member of the transmission,
wherein the six torque transmitting mechanisms are selectively engageable in combinations of at least three to establish a plurality of forward speed ratios and at least one reverse speed ratio between the input member and the output member, and
wherein a first of the six torque transmitting mechanisms includes a binary clutch, a friction clutch disposed in parallel with the binary clutch, and an actuator configured to engage both the friction clutch and the binary clutch and is selectively engageable to interconnect the second member of the first planetary gear set and the first member of the third planetary gear set with the second member of the fourth planetary gear set.

9. The transmission of claim 8, wherein the three interconnecting members comprises a first interconnecting member continuously interconnecting the second member of the first planetary gear set with the first member of the third planetary gear set, a second interconnecting member continuously interconnecting the third member of the first planetary gear set with the second member of the second planetary gear set and a third interconnecting member continuously interconnecting the first member of the second planetary gear set with the second member of the third planetary gear set and the third member of the fourth planetary gear set.

10. The transmission of claim 9, wherein a second of the six torque transmitting mechanisms is selectively engageable to interconnect the first member of the first planetary gear set and the input member with the second member of the fourth planetary gear set; a third of the six torque transmitting mechanisms is selectively engageable to interconnect the second member of the fourth planetary gear set with the stationary member; a fourth of the six torque transmitting mechanisms is selectively engageable to interconnect the third member of the third planetary gear set with the stationary member; a fifth of the six torque transmitting mechanisms is selectively engageable to interconnect the third member of the second planetary gear set with the stationary member.

11. The transmission of claim 10, wherein the first torque transmitting mechanism further comprises a friction clutch backing plate that is acted against by the friction clutch, the friction clutch backing plate configured to selectively apply pressure on the binary clutch.

12. The transmission of claim 11, wherein the first torque transmitting mechanism further comprises a biasing member and a binary clutch backing plate, the biasing member being configured to bias the friction clutch backing plate away from the binary clutch, the biasing member being disposed between the friction clutch backing plate and the binary clutch backing plate, the friction clutch backing plate being configured to compress the biasing member such that when the biasing member is compressed to an engaged position, the friction clutch backing plate engages the binary clutch.

13. The transmission of claim 12, further comprising a fourth interconnecting member continuously connected to the second member of the fourth planetary gear set,
wherein the binary clutch is a dog clutch, the binary clutch being disposed adjacent to the friction clutch, the friction clutch being disposed between the binary clutch and the actuator,
wherein the binary clutch has a first half having a first set of teeth and a second half having a second set of teeth, the first half being configured to rotate with the fourth interconnecting member and the second half being configured to rotate with the first interconnecting member, and wherein the friction clutch has at least one first clutch plate and at least one second clutch plate, the first clutch plate being configured to rotate with the fourth interconnecting member and the second clutch plate is configured to rotate with the first interconnecting member.

14. The transmission of claim 10, wherein the transmission is configured to apply a first pressure to the actuator such that when the first pressure is applied to the actuator, the friction clutch is engaged while the binary clutch remains disengaged, and the transmission is configured to apply a second pressure to the actuator such that when the second pressure is applied to the actuator, the binary clutch is engaged, wherein the second pressure is greater than the first pressure.

15. The transmission of claim 14, wherein a sixth of the six torque transmitting mechanisms is selectively engageable to interconnect the first member of the second planetary gear set and the second member of the third planetary gear set with the third member of the second planetary gear set.

16. The transmission of claim 14, wherein a sixth of the six torque transmitting mechanisms is selectively engageable to interconnect the first member of the second planetary gear set and the second member of the third planetary gear set with the second member of the second planetary gear set.

17. The transmission of claim 14, wherein a sixth of the six torque transmitting mechanisms is selectively engageable to interconnect the second member of the second planetary gear set and the third member of the first planetary gear set with the third member of the second planetary gear set.

18. The transmission of claim 14, wherein the first member of the first planetary gear set, the third member of the second planetary gear set, the third member of the third planetary gear set and the third member of the fourth planetary gear set are sun gears, the second members of the first, second, third and fourth planetary gear sets are carrier members and the third member of the first planetary gear set, the first member of the second planetary gear set, the first member of the third planetary gear set and the first member of the fourth planetary gear set are ring gears.

19. The transmission of claim 18, wherein the first torque transmitting mechanism further comprises a friction clutch backing plate that is acted against by the friction clutch, the friction clutch backing plate configured to selectively apply pressure on the binary clutch.

20. The transmission of claim 19, wherein the first torque transmitting mechanism further comprises a biasing member and a binary clutch backing plate, the biasing member being configured to bias the friction clutch backing plate away from the binary clutch, the biasing member being disposed between the friction clutch backing plate and the binary clutch backing plate, the friction clutch backing plate being configured to compress the biasing member such that when the biasing member is compressed to an engaged position, the friction clutch backing plate engages the binary clutch.

21. The transmission of claim 20, further comprising a fourth interconnecting member continuously connected to the second member of the fourth planetary gear set,
wherein the binary clutch is a dog clutch, the binary clutch being disposed adjacent to the friction clutch, the friction clutch being disposed between the binary clutch and the actuator,
wherein the binary clutch has a first half having a first set of teeth and a second half having a second set of teeth, the first half being configured to rotate with the fourth interconnecting member and the second half being configured to rotate with the first interconnecting member, and
wherein the friction clutch has at least one first clutch plate and at least one second clutch plate, the first clutch plate being configured to rotate with the fourth interconnecting member and the second clutch plate is configured to rotate with the first interconnecting member.

22. A transmission comprising:
an input member;
an output member;
first, second, third and fourth planetary gear sets each having a sun gear, a carrier member and a ring gear, wherein the input member is continuously connected for common rotation with the sun gear of the first planetary gear set, and wherein the output member is continuously connected for common rotation with the ring gear of the fourth planetary gear set;
a first interconnecting member continuously interconnecting the carrier member of the first planetary gear set with the ring gear of the third planetary gear set;
a second interconnecting member continuously interconnecting the ring gear of the first planetary gear set with the carrier member of the second planetary gear set;
a third interconnecting member continuously interconnecting the ring gear of the second planetary gear set with the carrier member of the third planetary gear set and the sun gear of the fourth planetary gear set;
a first torque transmitting mechanism selectively engageable to interconnect the sun gear of the first planetary gear set and the input member with the carrier member of the fourth planetary gear set;
a second torque transmitting mechanism selectively engageable to interconnect the carrier member of the first planetary gear set and the ring gear of the third planetary gear set with the carrier member of the fourth planetary gear set;
a third torque transmitting mechanism selectively engageable to interconnect the carrier member of the fourth planetary gear set with a stationary member of the transmission;
a fourth torque transmitting mechanism selectively engageable to interconnect the sun gear of the third planetary gear set with the stationary member;
a fifth torque transmitting mechanism selectively engageable to interconnect the sun gear of the second planetary gear set with the stationary member; and
a sixth torque transmitting mechanism selectively engageable to interconnect the ring gear of the second planetary gear set and the carrier member of the third planetary gear get set with one of the following: a) the sun gear of the second planetary gear set; and b) the carrier member of the second planetary gear set and the ring gear of the first planetary gear set,
wherein the torque transmitting mechanisms are selectively engageable in combinations of at least three to establish a plurality of forward speed ratios and at least one reverse speed ratio between the input member and the output member,
wherein the second torque transmitting mechanism includes a binary clutch, a friction clutch disposed in parallel with and adjacent to the binary clutch, and an actuator configured to engage both the friction clutch and the binary clutch, the friction clutch being disposed between the binary clutch and the actuator, the friction clutch having a friction clutch backing plate against which the friction clutch is applied, the friction clutch backing plate being configured to selectively apply pressure on the binary clutch,
wherein the second torque transmitting mechanism includes a biasing member and a binary clutch backing plate, the biasing member being configured to bias the friction clutch backing plate away from the binary clutch, the biasing member being disposed between the friction clutch backing plate and the binary clutch backing plate, the friction clutch backing plate being configured to compress the biasing member such that when the biasing member is compressed to an engaged position, the friction clutch backing plate engages the binary clutch,
wherein the binary clutch has a first half having a first set of teeth and a second half having a second set of teeth, the first half being configured to rotate with a fourth interconnecting member and the second half being configured to rotate with the first interconnecting member, and wherein the friction clutch has at least one first clutch plate and at least one second clutch plate, the first clutch plate being configured to rotate with the fourth interconnecting member and the second clutch plate being configured to rotate with the first interconnecting member, and
wherein the transmission is configured to apply a first pressure to the actuator such that when the first pressure is applied to the actuator, the friction clutch is engaged while the binary clutch remains disengaged, and the transmission being configured to apply a second pressure to the actuator such that when the second pressure is applied to the actuator, the binary clutch is engaged, the second pressure being greater than the first pressure.

* * * * *